Patented Mar. 28, 1939

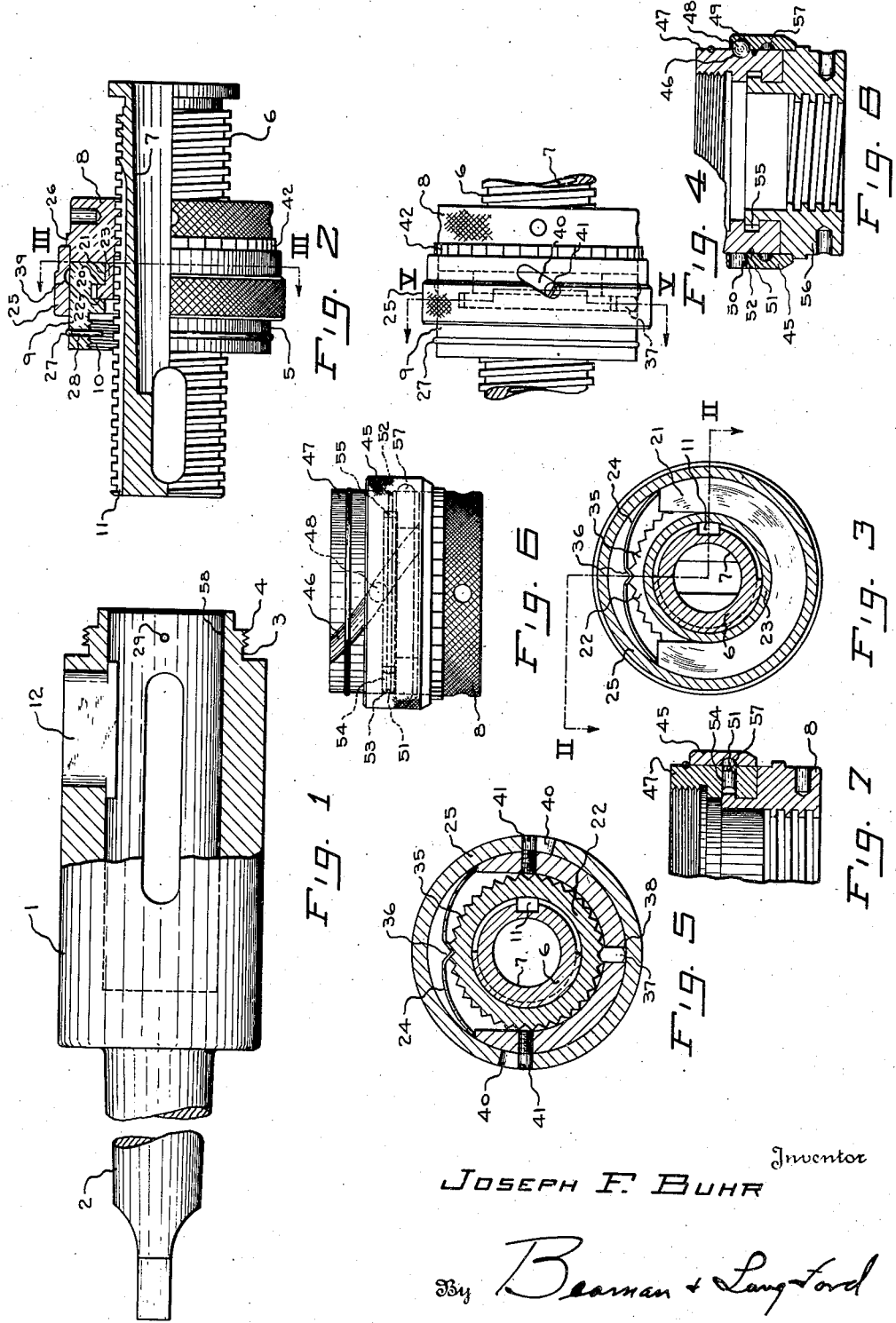

2,152,302

UNITED STATES PATENT OFFICE 2,152,302

LOCK FOR TOOL HOLDERS

Joseph F. Buhr, Ann Arbor, Mich., assignor to Buhr Machine Tool Company, Ann Arbor, Mich.

Application May 6, 1937, Serial No. 141,055

2 Claims. (Cl. 279—9)

This invention relates to adjusting mechanism and more particularly to a device for adjusting the length of any bar like member such as a drill or a tap and constitutes an improvement over the structure disclosed in my Patent No. 2,078,192.

In the case of drill presses, for example, relative axial adjustability of the tools is desired to regulate the cutting depth thereof. This adjustment is particularly desirable in multiple spindle drill presses. Furthermore, suitable mechanism is necessary to lock the adjustment to prevent its accidental changing by chips or otherwise. The aforesaid patent discloses one form of lock but is not wholly satisfactory for the reason that operators often neglect to actuate the lock with the result that adjustments are changed and work is spoiled. The present invention overcomes the disadvantages in said construction by providing a lock which is automatically actuated to prevent accidental change of adjustment.

Accordingly, an object of the present invention is to provide a tool adjustment structure having an automatically operating lock.

Another object of the invention is to provide a tool adjustment structure having a lock which is moved into operative position by the partial rotation of a locking ring.

A further object of the invention is to provide a tool adjustment structure having locking means actuated by chips formed by the tool.

A still further object is to provide a combination locking and ratcheting device for a tool holder.

These and other objects will be apparent from the following specification when taken with the accompanying drawing in which Fig. 1 is an elevation of the tool holder body partially broken away to show a vertical section, Fig. 2 is a section on the line II—II of Fig. 3 showing the adjustment and locking structure, Fig. 3 is a section on the line III—III of Fig. 2, Fig. 4 is an elevation of the adjusting and locking mechanism, Fig. 5 is a section on the line V—V of Fig. 4, Fig. 6 is an elevation of another embodiment of the invention, and Figs. 7 and 8 are partial sections of the embodiment of the invention illustrated in Fig. 6.

Referring particularly to the drawing in Fig. 1 the reference character 1 indicates a tool holder body having a usual tapered shank 2. At the outer end of the body 1 is provided a reduced portion 3 having threads 4 for receiving the hardened adjustment and locking assembly 5. Within the assembly 5 is a tool receiving socket 6 having an interior tapered bore 7 for receiving a tool such as a drill. The socket 6 is threaded to the adjustment portion 8. The adjustment portion 8 is associated for relative rotation with respect to a removable body 9 having internal threads 10 for engagement with the threads 4 on the body 1, so that upon rotation of the adjustment portion 8 the socket 6 is moved axially relatively to the assembly 5 and the body 1. A keyway 11 in the socket 6 and a key 12 in the body 1 cooperate to prevent rotation of the socket 6 during rotation of the adjustment portion 8.

As shown particularly in Fig. 2 the body 9 is provided near its outer end with an internal annular groove 20, which defines with the outer end of the body 9 a radially inwardly extending flange 21. The adjustment portion 8 is provided with an annular flange 22 which extends radially outwardly from a sleeve 23 comprising a restricted inward extension of the adjustment portion 8. The sleeve 23 is of a length substantially the same as the width of the flange 21. As will be observed in Fig. 2 the radially outwardly extending flange 22 is disposed in the internal annular groove 20. In order to assemble the flange 22 in the groove 20 a portion of the flange 21 is cut away as disclosed in Fig. 3 providing a clear transverse opening of a width substantially equal to the diameter of the sleeve 23. Thus, when it is desired to either assemble or disassemble the adjustment member 8 and the body 9 it is merely necessary to move the adjustment portion 8 sidewise with respect to the body 9 maintaining the respective axes parallel.

In order to maintain the adjustment portion 8 and the body 9 in assembled relation a leaf spring 24 is disposed across the opening provided by the cutting away of the portion of the flange 21 and means in the form of a ring 25 slidable on the surface of the body 9 prevents displacement of the spring 24. The movement of the ring 25 is limited by the surface ring 26 on the adjustment portion 8 and by a spring locking ring 27 disposed in a groove in the surface of the body 9. The spring ring 27 has one end thereof projecting radially inwardly through a bore 28 in the body 9 and a bore 29 in the body 1. The radially projecting end of the ring 27 thus functions to lock the body 9 and the body 1 against accidental relative rotative movement.

It will be clear from the foregoing description that rotation of the adjustment portion 8 will result in axial movement of the socket 6, the direction of movement of the socket 6 depending on the direction of the rotation of the adjustment portion 8. In order to somewhat restrict the adjusting movement of the adjustment portion 8 ratchet mechanism is provided. This ratchet mechanism is provided by teeth 35 on the periphery of the flange 22 and a detent 36 at the midpoint of the spring 24. When the ring 25 is over the spring 24 it maintains the detent 36 in engagement with the teeth 35. The spring 24 has a curvature of greater radius than that of the flange 22 so that the spring 24 may resiliently yield outwardly to permit the teeth 35 to ratchet past the detent 36.

In order to lock the socket 6 in adjusted position there is provided in the body 9 a pin 37 having a wedge-shaped end, slidable in a radially extending opening 38. The wedge-shaped end of the pin 37 is shaped to engage with the teeth 35. To prevent the pin 37 from twisting on its axis and thereby making proper seating of the wedged end between the teeth 35 impossible, the pin 37 and the opening 38 are both square. The pin 37 is in that portion of the body 9 normally beneath the ring 25. On the inner surface of the ring 25 is an annular groove 39 adapted to register with the opening 38 when the ring 25 is in its rearmost position. In this position the pin 37 may ride outwardly into the groove 39 becoming disengaged from the teeth 35. However, when the ring 25 is moved forwardly, that is, to the right in Fig. 2 the pin 37 is cammed inwardly by the ring 25 and into engagement with the teeth 35 to lock the assembly 5 in adjusted position.

The structure thus far described would be sufficient to provide adequate locking if workmen would, after having made an adjustment, move the ring 25 forwardly into locking position. However, they often neglect to do this with the result that chips curling upwardly engage with the adjustment portion 8, rotate it and change the adjustment. In order to overcome this danger of changed adjustment the ring 25 is provided on diametrically opposite sides thereof with diagonally disposed slots 40. Passing through the slots 40 are screws 41 threaded into the body 9. Thus in the embodiment of the invention disclosed clockwise rotation of the ring 25 will result in its being moved forwardly into locking position. The particular advantage of this feature is that if the ring 25 is not manually moved into locking position an upwardly curling chip engaging the same will rotate it and automatically lock the assembly in adjusted position.

In use, if it is desired to disassemble the assembly 5 for replacing the adjustment portion 8 and socket 6 with a different size, or for some other reason, the locking ring 27 is removed, the screws 41 removed from the slots 40 and the ring 25 moved rearwardly to expose the spring 24. The spring 24 may then be readily removed and the adjustment portion 8 lifted from the body 9. Assembly of the elements is accomplished, of course, in the reverse order. Adjustment of the socket 6 and consequently a drill or other tool held therein is accomplished by rotating the locking ring 25 in a counterclockwise direction to permit the locking pin 37 to move outwardly into the annular groove 39 and then rotating the adjustment portion 8 in the direction desired. The structure is calibrated so that for each tooth 35 that ratchets past the detent 36 a predetermined axial movement of the socket 6 is obtained. In order to provide an indication of adjustments made, the ring 26 on the surface of adjustment portion 8 is provided with a series of graduations 42 to visually indicate the distance moved by the socket 6 for each ratchet tooth 35 moved past the detent 36.

Figs. 6, 7 and 8 disclose another embodiment of the invention wherein a single detent acts both as a lock and a ratchet member and in which a different construction is used to axially move the locking ring 45 upon rotation thereof. As shown in Figs. 6 and 8 the structure for axially moving the locking ring 45 comprises a groove 46 cut into the movable body 47 at an angle to the axis of the movable body 47. Within the groove 46 travels a ball 48 seated in a depression 49 in the locking ring 45. As shown particularly in Fig. 8 the depression 49 is formed by drilling through the locking ring 45 from the opposite side thereof there being formed a functionless opening 50. The groove 46 and the depression 49 are of such a depth as to jointly receive the ball 48 with a slight clearance. Thus when the locking ring 45 is rotated the ball 48 will travel along the groove 46 and provide the locking ring 45 with an axial movement corresponding to that provided in the first embodiment of the invention by the inclined slots 40 and the screws 41.

The lock and ratchet device in the present embodiment is specifically distinguished from the first embodiment of the invention in that the spring 24 having the detent 36 is eliminated and replaced by a locking wire 51 disposed in an annular groove 52 seating in a slot 53 in the pin 54. The pin 54 is similar to the pin 37 in every respect except that it is provided with the slot 53 at its outer end. The pin 54 engages with the ratchet teeth 55 integral with the adjustment portion 56. In operation when the locking ring 45 is rotated the annular groove 57 on the inner side thereof is moved to and from registry with the pin 54. Thus when the groove 57 is not in registry with the pin 54 the pin 54 is held against the ratchet teeth 55 and thereby locks the adjustment portion 56 against accidental movement. When the groove 57 is in registry with the pin 54 the pin 54 may move outwardly against the resilient locking wire 51 but is resiliently urged against the ratchet teeth 55 thereby providing a ratcheting action for the purpose hereinabove described. It will thus be seen that in the second embodiment of the invention disclosed in Figs. 6, 7 and 8 the pin 54 is made to do the work formally done by the detent 36 and the pin 37 of the first embodiment. The operation and ultimate results obtained in the second embodiment, however, are the same as in the first embodiment.

The absence of the spring 24 and the detent 36 will not in any way diminish the firmness of the assembly for the reason that the tool receiving socket 6 is snugly received by the bore 58 in the body 1 thus preventing sidewise movement of the adjustment portion 8 with respect to the removable body 9 and the body 1 after the tool receiving socket 6 is moved to its working position.

It will be obvious from the foregoing description that other structural embodiments of the invention may be devised within the scope and spirit of the invention, and, therefore, I do not wish to be limited except by the scope of the following claims:

I claim:

1. In a tool holder of the character described having a body, a tool support rotatably mounted therein, and means for locking said support to said body, an adjustable sleeve for holding said locking means in operative position, so mounted on said body that force on said sleeve induced by chip pressure will tend by rotation thereof to move said sleeve to maintain said locking means in operative position.

2. In a tool holder of the character described having a body, a tool support rotatably mounted therein, and means for locking said support to said body, an adjustable sleeve for holding said locking means in operative position, said body and locking means having a pin and slot connection, the slot being angularly inclined to the longitudinal axis of said body, said sleeve being so mounted on said body that force on said sleeve induced by chip pressure will tend by rotation thereof and by action of said pin and slot connection to move said sleeve to maintain said locking means in operative position.

JOSEPH F. BUHR.